Patented Dec. 23, 1930

1,785,845

UNITED STATES PATENT OFFICE

RICHARD STUESSER, OF COLOGNE-ON-THE-RHINE, GERMANY, ASSIGNOR TO GENERAL ANILINE WORKS, INC., OF NEW YORK, N. Y., A CORPORATION OF DELAWARE

PROCESS FOR THE PRODUCTION OF AZO DYESTUFFS AND AZO DYESTUFFS OBTAINABLE THEREBY

No Drawing. Application filed July 11, 1927, Serial No. 205,041, and in Germany July 29, 1926.

This invention relates to a process for the production of azo dyestuffs, and to new azo dyestuffs obtainable thereby.

It has been found that valuable azo dyestuffs having the general formula

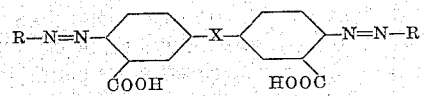

wherein R represents the residue of any coupling component containing in ortho-position to the azo group a substituent of the group comprising amino, arylamino, acylamino, hydroxyl and the desmotropic keto group; and X represents one of the groups azoxy and azo, may be obtained by subjecting 2 molecular proportions of dyestuffs having the general formula

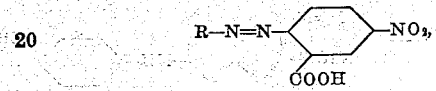

wherein R represents any coupling component containing an auxochrome group, to careful reduction with alkaline reduction means, such as, for example, reduction by means of grape sugar and alkaline acting agents, particularly caustic soda solution. When proceeding in this way there are obtained at first the azoxy compounds and then by enhancing the reducing action the corresponding azo compounds. It has been ascertained that the azo compounds generally possess a deeper coloration than the corresponding azoxy compounds and that the reduction process can be controlled by watching the coloration of the reaction mixture. In many cases, however, the reduction process cannot be controlled exactly and the reaction products in these cases represent mixtures of the azoxy compounds and the corresponding azo compounds. The formulæ of the reaction products obtainable according to the examples described hereafter have been ascertained as far as possible. However, in view of the above, it is to be understood that all these reaction products may represent partial mixtures.

The coupling components, represented by the reference character R in the above general formulæ, may be any suitable auxochrome group-containing intermediates such as, for instance, naphthol sulfonic acids, naphthlyamine sulfonic acids, phenol, aromatic amines, aromatic diamines, pyrazolons and aceto-acetic arylides, containing therein sulfonic, or carboxylic, acid groups, or, as in the case where the reference character X in the above general formula represents the azo group, the coupling components may be monoazo-, or polyazo-, dyestuffs.

The new dis-, and poly-, azo dyestuffs, obtained by practicing the process according to the present invention, are generally soluble in water with a yellowish to bluish-black coloration, soluble in concentrated sulfuric acid with a yellowish to bluish coloration, and dye cotton orange to blue to black shades which may be rendered fast to washing and to light by after-treatment with heavy metal salts such as, for example, salts of copper, chromium and cobalt. When subjected to reduction with stannous chloride and hydrochloric acid, 1 molecule of the new dyestuff yields 2 molecules of 1.4-phenylenediamine carboxylic acid and 2 molecules of an aromatic amine; in those cases where the reference character R in the above general formulæ represents an azo dyestuff, the azo groups also may be reduced, as well as any nitro-groups when present. If acetylamino groups are present in the dyestuffs, the reduction with stannous chloride and hydrochloric acid converts them into amino compounds and acetic acid.

The present invention may be illustrated by the following examples:

*Example 1*

182 parts by weight of 5-nitro-2-aminobenzoic acid are diazotized in the known manner, and coupled, in an alkaline medium, with 239 parts by weight of 2-amino-8-hydroxy-naphthalene-6-sulfonic acid. Subsequently, 1000 parts by weight of 38° Bé. caustic soda solution and 140 parts by weight of grape sugar are added and the mixture is heated to about 50° C. until the reduction of the nitro groups to azoxy or azo has been finished. In the case of reduction to azo, the resulting diamino-azo-dyestuff product, having most probably the formula:

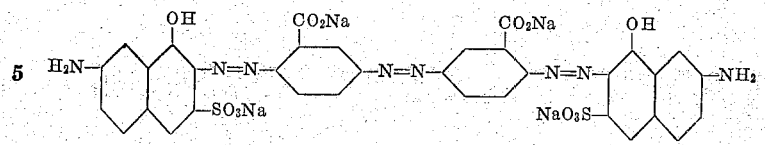

is freed from salt and filtered; it is then tetrazotized in the known manner and coupled with 330 parts by weight of 2.4-diaminoacetanilid. The resulting dyestuff, having most probably the formula:

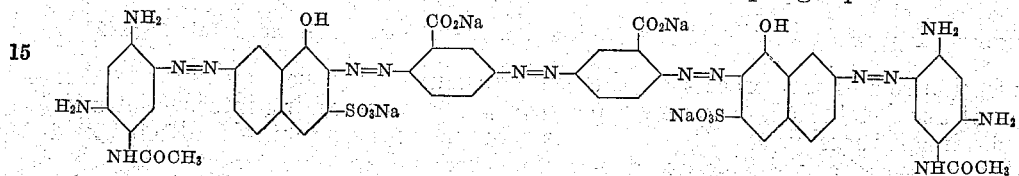

is, when dried and pulverized, a black powder soluble in water and in concentrated sulfuric acid with a blue coloration, the sulfuric acid solution when poured into water becoming violet. It dyes cotton black shades which are rendered fast to washing and to light by after-treatment with chromium salts.

*Example 2*

182 parts by weight of 5-nitro-2-aminobenzoic acid are diazotized, as above, and coupled with 239 parts by weight of 2-amino-5-hydroxynaphthalene-7-sulphonic acid. Then, the nitro group resulting from the monoazo dyestuff is reduced in alkaline solution with grape sugar at 50° C. into the azoxy or azo compound, respectively, and the trisazo-dyestuff, or disazooxy-dyestuff, respectively, is freed from the reaction mixture in the known manner. It is, when dried and pulverized, a black powder which dyes cotton violet shades. It has most probably the formula:

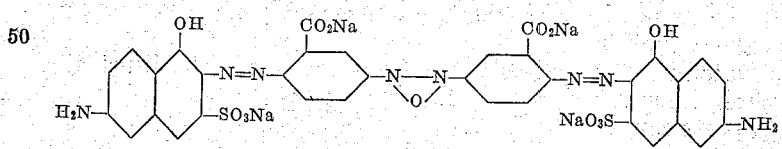

The dyestuff can be further diazotized on the fiber and coupled with the well known developers and resulting dyeings can be subjected to after-treatment with chromium salts. For instance, coupled in this manner with β-naphthol and subjected to after-treatment with copper sulfate, a fast black-blue shade is obtained.

*Example 3*

182 parts by weight of 5-nitro-2-aminobenzoic acid are diazotized and coupled, in the well known manner, with 315 parts by weight of 2-phenyl-amine-5-hydroxynaphthalene-7-sulfonic acid, then 1500 parts by weight of 38° Bé. caustic soda solution and 175 parts by weight of grape sugar are put into the coupling liquor and heated to about 60° C. until the azo-dyestuff has separated in crystal form. The dyestuff is, when dried and ground, a black powder soluble in hot water and in concentrated sulfuric acid with bluish-red coloration. When the sulfuric acid solution is poured into water, it becomes bluish-violet. The dyestuff yields on cotton violet shades which, by after-treatment with copper chloride, are changed into a clear blue which is fast against washing and light-effects. It has most probably the formula:

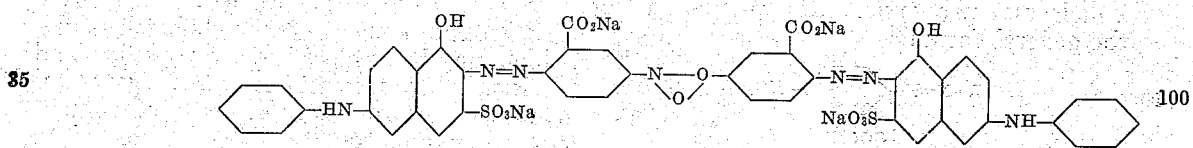

*Example 4*

182 parts by weight of 5-nitro-2-aminobenzoic acid are diazotized as above and, in a solution made acid with acetic acid, coupled with 280 parts by weight of 2-acetylamino-5-hydroxynaphthalene-7-sulfonic acid; then 2000 parts by weight of 38° Bé. caustic soda solution and 175 g. of grape-sugar are added to the coupling liquor and the mixture is heated to about 60° C. until a sample of the dyestuff product colors cotton well. The resulting dyestuff product is separated in known manner. It is a black powder which yields on cotton shades similar to those obtained from the dyestuff described in Example 2.

*Example 5*

182 parts by weight of 5-nitro-2-aminobenzoic acid are diazotized, in the known manner, and coupled, in a dilute acetic acid solution, with 306 parts by weight of 1-β-naphthyl-3-methyl-5-pyazolon-6'-sulfonic acid, whereupon 2500 parts by weight of 38° Bé. caustic soda solution and 175 parts by weight of grape sugar are added and the mixture is heated until a sample of the resulting dyestuff colors cotton well. The dyestuff is, then, freed from salts, filtered and dried. In its free state it has the probable formula

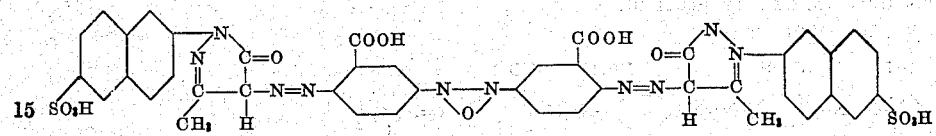

It is a brown powder which yields on cotton orange shades which are changed to brick-red shades of good fastness by after-treatment with copper salts.

*Example 6*

Two molecular proportions of the dyestuff obtained by coupling 1 molecular proportion of 2-diethylamino-5-naphthol-7-sulfonic acid with 1 molecular proportion of the diazo-compound of 5-nitro-2-amino-benzoic acid are carefully reduced by heating, at a temperature above normal room temperature,— say about 40° C.,—with grape sugar in an alkaline acting medium. The reduction product, when freed from the reaction mixture in the known manner, is a dyestuff having most probably the formula

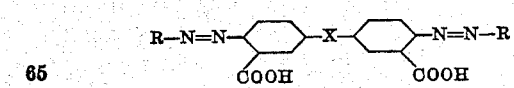

It is soluble in water and in concentrated sulfuric acid with a bluish-red coloration; the sulfuric acid solution when poured into water assuming a bluish coloration. It dyes cotton bluish violet shades which, upon after-treatment with copper salts, are converted to blue shades of good fastness properties with respect to washing and to light. Reduction of 1 molecule of the dyestuff with stannous chloride and hydrochloric acid yields 2 molecules of phenylenediamine-carboxylic acid and 2 molecules of 2-amino-6-diethylamino-1-naphthol-3-sulfonic acid.

I claim:

1. As new products, azo dyestuffs having the general formula

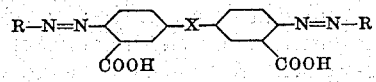

wherein R represents the residue of any coupling component containing in ortho-position to the azo group a substituent of the group comprising amino, aryl-amino, acyl-amino, hydroxyl and the desmotropic keto group, and X represents one of the groups azoxy and azo, which dyestuffs are generally soluble in water and in concentrated sulfuric acid, and yield on cotton orange to blue to black shades which may be rendered fast to washing and to light by after-treatment with heavy metal salts.

2. As new products, azo dyestuffs having the general formula

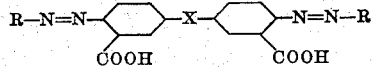

wherein X represents one of the groups azoxy and azo, and wherein R represents the residue of any coupling component being substituted in ortho-position to the azo group by hydroxyl, which dyestuffs are generally soluble in water and in concentrated sulfuric acid and yield on cotton orange to blue to black shades which may be rendered fast to washing and to light by after-treatment with heavy metal salts.

3. As new products, azo dyestuffs having the general formula

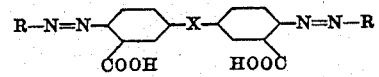

wherein X represents one of the groups azoxy and azo and R represents a residue of a compound of the naphthalene series which is substituted in ortho-position to the azo group by hydroxyl and may be further substituted, which dyestuffs are generally soluble in water and in concentrated sulfuric acid, and yield on cotton orange to blue to black shades which may be rendered fast to washing and to light by after-treatment with heavy metal salts.

4. As new products, azo dyestuffs having the general formula wherein X represents one of the groups azoxy and azo and R represents a residue of an α-napthol-β-sulfonic acid substituted by a group containing a tervalent notrogen atom which is not directly joined to an oxygen atom, which dyestuffs are generally soluble in water and in concentrated sulfuric acid, and yield on cotton orange to blue to black shades which may be rendered fast to washing and to light by after treatment with heavy metal salts.

5. As a new product, the azo dyestuff having most probably the formula

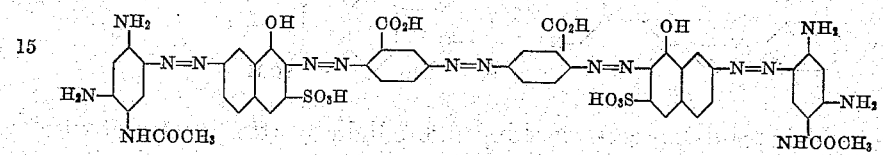

which dyestuff is, in the dried and pulverized state, a black powder soluble in water and in concentrated sulfuric acid with a blue coloration, soluble in dilute sulfuric acid with a violet coloration, and yielding on cotton black dyeings which are rendered fast to washing and to light by after-treatment with chromium salts.

In testimony whereof, I affix my signature.

RICHARD STUESSER.